Patented Apr. 15, 1930

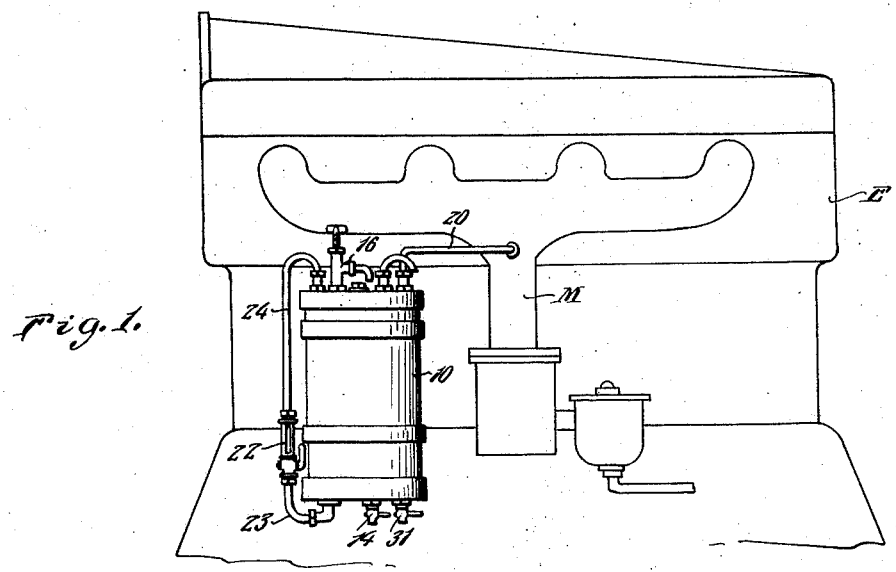
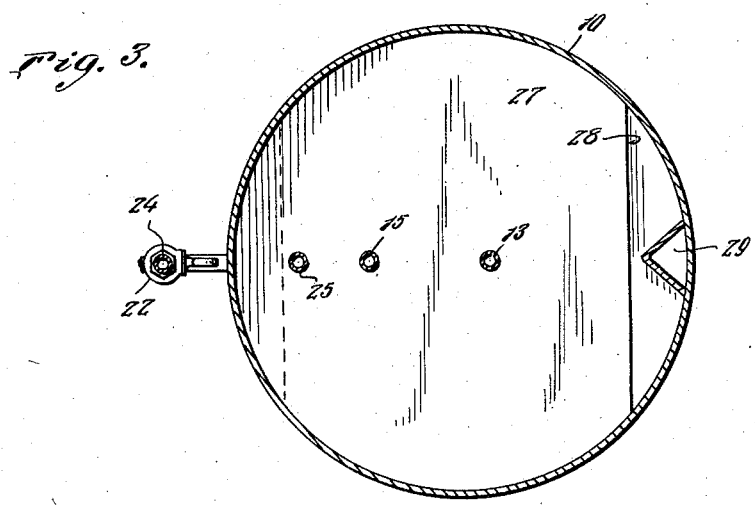

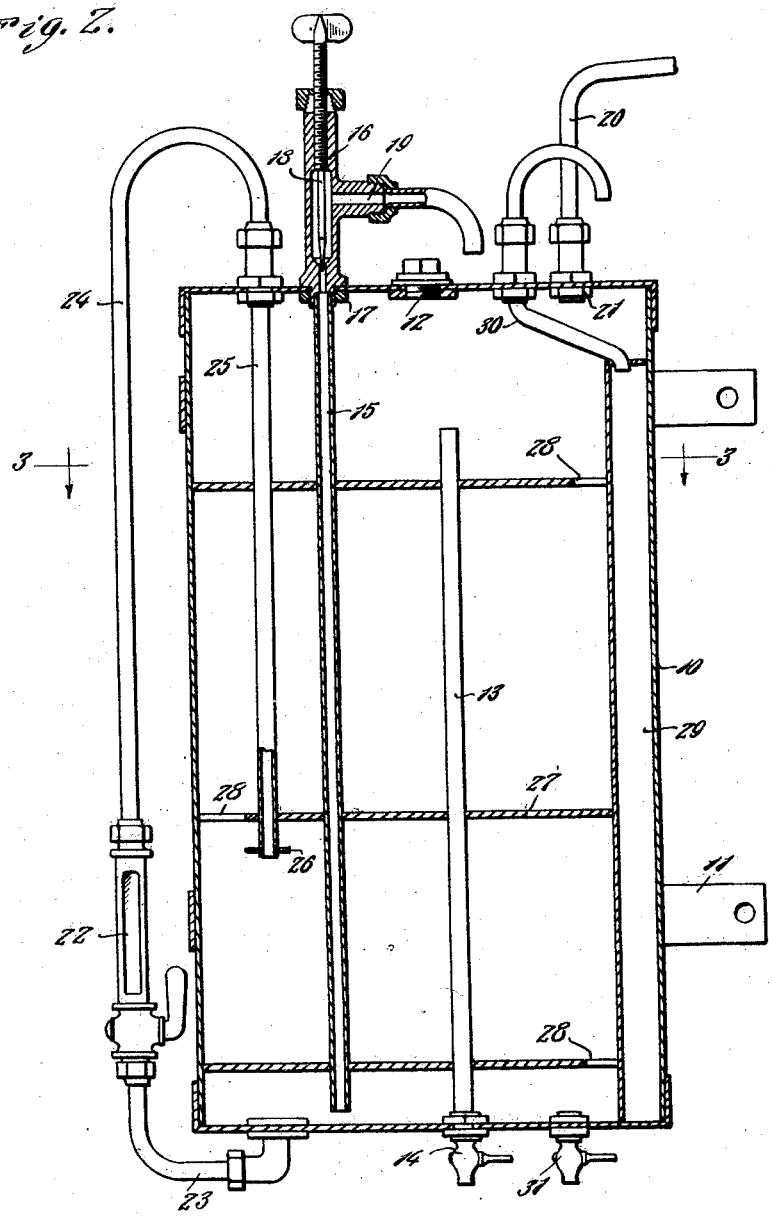

1,755,056

UNITED STATES PATENT OFFICE

WALTER E. DE WEESE, OF CLEVELAND, OHIO

MOTOR-MOISTENING DEVICE

Application filed August 26, 1927. Serial No. 215,668.

This invention relates to air moistening devices for internal combustion engines, and has for an object the provision of a device which may be attached to an automobile or other engine to provide a supply of moistened air.

Other objects of the invention are to provide means for accurately controlling the supply of air; regulating the level of water within the water container; direct the course of travel of the air through the water so that the air will pick up a maximum amount of moisture; compensate for expansion in the event of freezing, and to indicate the approach of a low level of water within the container prior to the water reaching a predetermined low level.

With the above and other objects in view, the invention further includes the following novel features and details of construction, to be hereinafter more fully described, illustrated in the accompanying drawings and pointed out in the appended claim.

In the drawings:—

Figure 1 is a fragmentary side elevation illustrating the invention.

Figure 2 is an enlarged vertical sectional view of the invention.

Figure 3 is a section taken substantially on the line 3—3 of Figure 2.

Referring to the drawings in detail wherein like characters of reference denote corresponding parts, the reference character 10 indicates a tank or container designed to contain a supply of water and which is designed to be attached to a suitable support, such as the dash of an automobile, through the medium of clamps or brackets 11. The tank is adapted to contain a supply of water introduced through an opening which is normally closed by a plug 12, while extending upwardly from the bottom of the tank and positioned centrally thereof is an overflow pipe 13. This pipe terminates short of the top of the tank and is provided at its bottom with a drain cock 14. By means of the drain cock, excess water may be permitted to flow from the tank until the water reaches the level of the upper end of the pipe 13. This level will be substantially the same irrespective of the vertical or inclined position of the tank. This is due to the fact that the pipe 13 is centrally located.

Extending downwardly from the top of the tank is a pipe or tube 15. The lower open end of this tube terminates short of and adjacent the bottom of the tank while the upper end of the tube is threaded into the lower end of a valve casing 16, the latter extending through an opening provided in the top of the tank and being engaged by a nut 17, whereby the valve casing is removably held in place. The casing 16 has located therein a needle valve 18. The casing is also provided with an air inlet port 19, the needle valve controlling the passage of air into the pipe 15, so that by adjusting the needle valve, the supply of air admitted to the tank may be accurately controlled. The tank is provided with an outlet pipe 20 which extends through an opening in the top of the tank and receives a nut 21, the connection being similar to the connection for the valve casing 16, so that these elements, that is, the pipe 20, and the pipe 15 and valve 16, may be transposed or substituted for one another. The pipe 20 is adapted for connection with the intake manifold M of an internal combustion engine E, as shown in Figure 1 of the drawings, so that by transposing the pipes 15 and 20, the tank may be adapted to different types of automobiles, as it may be placed upon either side of the intake manifold.

Mounted upon the tank is a sight gauge 22 whose lower end is in communication with the bottom of the tank by means of a pipe 23, while a pipe 24 provides communication between the upper end of the sight gauge and the upper end of the tank. A pipe 25 extends downwardly from the pipe 22 into the tank and its lower open end terminates adjacent the upper end of the sight gauge. A plate or washer 26 is carried at the lower end of the pipe 25.

Arranged within the tank are vertically spaced baffle plates 27. These plates are provided with openings to receive the pipes 13, 15 and 25, and with openings 28 so that in addition to providing baffles, these plates act to steady and support the pipes just mentioned. The openings 28 are relatively offset so that air which is admitted to the tank through the lower end of the pipe 25, must travel a circuitous path through the water and thus pick up a maximum amount of moisture before being drawn outward through the pipe 20 by the suction of the engine. The sight gauge 22 will indicate the level of water in the tank when such level falls below the lower end of the pipe 25, and will thus indicate that the tank needs refilling.

Located within the tank is a vertically extending cross sectionally V-shaped expansion chamber 29, the walls of which are flexible. This chamber is in communication with the atmosphere through the pipe 30 which extends through the top of the tank. In the event of water in the tank freezing, the flexible walls of the expansion chamber will take care of the expansion within the tank and prevent the latter from bursting.

The tank is provided with a drain cock 31.

The invention is susceptible of various changes in its form, proportions and minor details of construction and the right is herein reserved to make such changes as properly fall within the scope of the appended claim.

Having described the invention what is claimed is:—

In an air moistener for internal combustion engines, a tank adapted to contain a supply of water, a water inlet for the tank, a water outlet for said tank, a vertically disposed cross sectionally V-shaped partition formed of expansible material and located within the tank, said partition together with the walls of the tank defining an expansion chamber, said chamber being closed at opposite ends, and a vent pipe extending from said chamber to the atmosphere.

In testimony whereof I affix my signature.

WALTER E. DE WEESE.